United States Patent
Lee et al.

(10) Patent No.: US 9,516,576 B2
(45) Date of Patent: Dec. 6, 2016

(54) METHOD AND APPARATUS FOR RECEIVING EXTENDED ACCESS BARRING PARAMETERS IN WIRELESS COMMUNICATION SYSTEM

(71) Applicant: LG Electronics Inc., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/429,652

(22) PCT Filed: Sep. 27, 2013

(86) PCT No.: PCT/KR2013/008667
§ 371 (c)(1),
(2) Date: Mar. 19, 2015

(87) PCT Pub. No.: WO2014/051370
PCT Pub. Date: Apr. 3, 2014

(65) Prior Publication Data
US 2015/0237566 A1    Aug. 20, 2015

Related U.S. Application Data

(60) Provisional application No. 61/706,743, filed on Sep. 27, 2012.

(51) Int. Cl.
*H04W 4/00* (2009.01)
*H04W 48/06* (2009.01)
(Continued)

(52) U.S. Cl.
CPC ......... *H04W 48/06* (2013.01); *H04W 28/0289* (2013.01); *H04W 76/02* (2013.01); *H04W 48/08* (2013.01)

(58) Field of Classification Search
None
See application file for complete search history.

(56) References Cited

U.S. PATENT DOCUMENTS

| 8,478,286 B1 * | 7/2013 | Fan | H04W 72/0446 |
| | | | 455/410 |
| 2011/0058480 A1 | 3/2011 | Dahlen | |

(Continued)

FOREIGN PATENT DOCUMENTS

WO    2012107627    8/2012

OTHER PUBLICATIONS

3GPP TS 22.011 v11.2.0, "3GPP; TSGSSA; Service Accessibility (Release 11)", Dec. 21, 2011, see section 4.3.4.
(Continued)

*Primary Examiner* — Anh-Vu Ly
(74) *Attorney, Agent, or Firm* — Dentons US LLP

(57) ABSTRACT

A method and apparatus for receiving extended access barring (EAB) parameters in a wireless communication system is provided. A user equipment (UE) receives an EAB parameter, and receives an EAB parameter modification. The received EAB parameter is invalidated upon receiving the EAB parameter modification. The UE also waits for applying EAB until modified EAB parameter is received, and receives the modified EAB parameter.

6 Claims, 11 Drawing Sheets

(51) Int. Cl.
*H04W 28/02* (2009.01)
*H04W 76/02* (2009.01)
*H04W 48/08* (2009.01)

(56) References Cited

U.S. PATENT DOCUMENTS

| | | | | |
|---|---|---|---|---|
| 2012/0282965 A1* | 11/2012 | Kim | ............... | H04W 48/06 455/515 |
| 2013/0035064 A1* | 2/2013 | Balachandran | ....... | H04W 48/02 455/411 |
| 2013/0044702 A1* | 2/2013 | Jayaraman | ............ | H04W 48/06 370/329 |
| 2013/0107778 A1* | 5/2013 | Ryu | ............... | H04W 48/02 370/311 |
| 2013/0115913 A1* | 5/2013 | Lin | ............... | H04W 48/08 455/410 |
| 2013/0121225 A1* | 5/2013 | Ryu | ............ | H04W 52/0229 370/311 |
| 2014/0036669 A1* | 2/2014 | Yang | ............ | H04N 21/2365 370/230 |
| 2014/0128029 A1* | 5/2014 | Fong | ............... | H04W 48/12 455/411 |

OTHER PUBLICATIONS

3GPP TR 37.868 v11.0.0, "3GPP; TSGRAN; Study on RAN Improvements for Machine-type Communications; (Release 11)", Oct. 3, 2011, see section 5.1.1.2.

3GPP TS 22.368 v11.6.0, "3GPP; TSGSSA; Service Requirements for Machine-type Communications (MTC); Stage 1 (Release 11)", Sep. 19, 2012, see section 7.1.1.

Change Request, Huawei, HiSilicon: "Introduction to EAB in 36.331", 3GPP TSG-RAN WG2 Meeting #78, R2-123045, May 21-25, 2012.

ZTE: "Discussion on fast method for dynamic access control", 3GPP TSG RAN WG2#74, R2-112865, May 9-13, 2011.

Samsung: "Overview of solutions on MTC", 3GPP TSG RAN WG2 #74, R2-113261, May 9-13, 2011.

Huawei, HiSilicon: "Further consideration on EAB", 3GPP TSG-RAN WG2 Meeting #74, R2-112951, May 9-13, 2011.

* cited by examiner

METHOD AND APPARATUS FOR RECEIVING EXTENDED ACCESS BARRING PARAMETERS IN WIRELESS COMMUNICATION SYSTEM

This application is a 35 USC §371 National Stage entry of International Application No. PCT/KR2013/008667 filed on Sep. 27, 2013, and claims priority to U.S. Provisional Application No. 61/706,743 filed on Sep. 27, 2012, all of which are hereby incorporated by reference in their entireties as if fully set forth herein.

BACKGROUND OF THE INVENTION

1. Field of the Invention

The present invention relates to wireless communications, and more particularly, to a method and apparatus for receiving extended access barring (EAB) parameters in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

Extended access barring (EAB) is a mechanism for the operator(s) to control mobile originating access attempts from UEs that are configured for EAB in order to prevent overload of the access network and/or the core network. In congestion situations, the operator can restrict access from UEs configured for EAB while permitting access from other UEs. UEs configured for EAB are considered more tolerant to access restrictions than other UEs. When an operator determines that it is appropriate to apply EAB, the network broadcasts necessary information to provide EAB control for UEs in a specific area.

How to apply EAB parameters upon connection establishment should be clarified.

SUMMARY OF THE INVENTION

The present invention provides a method for receiving extended access barring (EAB) parameters in a wireless communication system. The present invention provides how a user equipment (UE) applies EAB parameters upon a connection establishment.

In an aspect, a method for receiving, by a user equipment (UE), extended access barring (EAB) parameters in a wireless communication system is provided. The method includes receiving an EAB parameter, and receiving an EAB parameter modification. The received EAB parameter is invalidated upon receiving the EAB parameter modification. The method includes waiting for applying EAB until modified EAB parameter is received, and receiving the modified EAB parameter.

The EAB parameter and the modified EAB parameter may be received via a system information block (SIB)-14 message.

The EAB parameter modification may be received via a paging message.

The method may further include applying EAB according to the modified EAB parameter.

The method may further include waiting for establishing a radio resource control (RRC) connection until the modified EAB parameter is received.

The UE may be in an RRC idle state.

The modified EAB parameter may be received without waiting until next system information modification period boundary.

In another aspect, a user equipment (UE) in a wireless communication system is provided. The UE includes a radio frequency (RF) unit for transmitting or receiving a radio signal, and a processor coupled to the RF unit, and configured to receive an EAB parameter, receive an EAB parameter modification. The received EAB parameter is invalidated upon receiving the EAB parameter modification. The processor is configured to wait for applying EAB until modified EAB parameter is received, and receive the modified EAB parameter.

UE behaviors for applying EAB parameters upon a connection establishment may be clarified.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
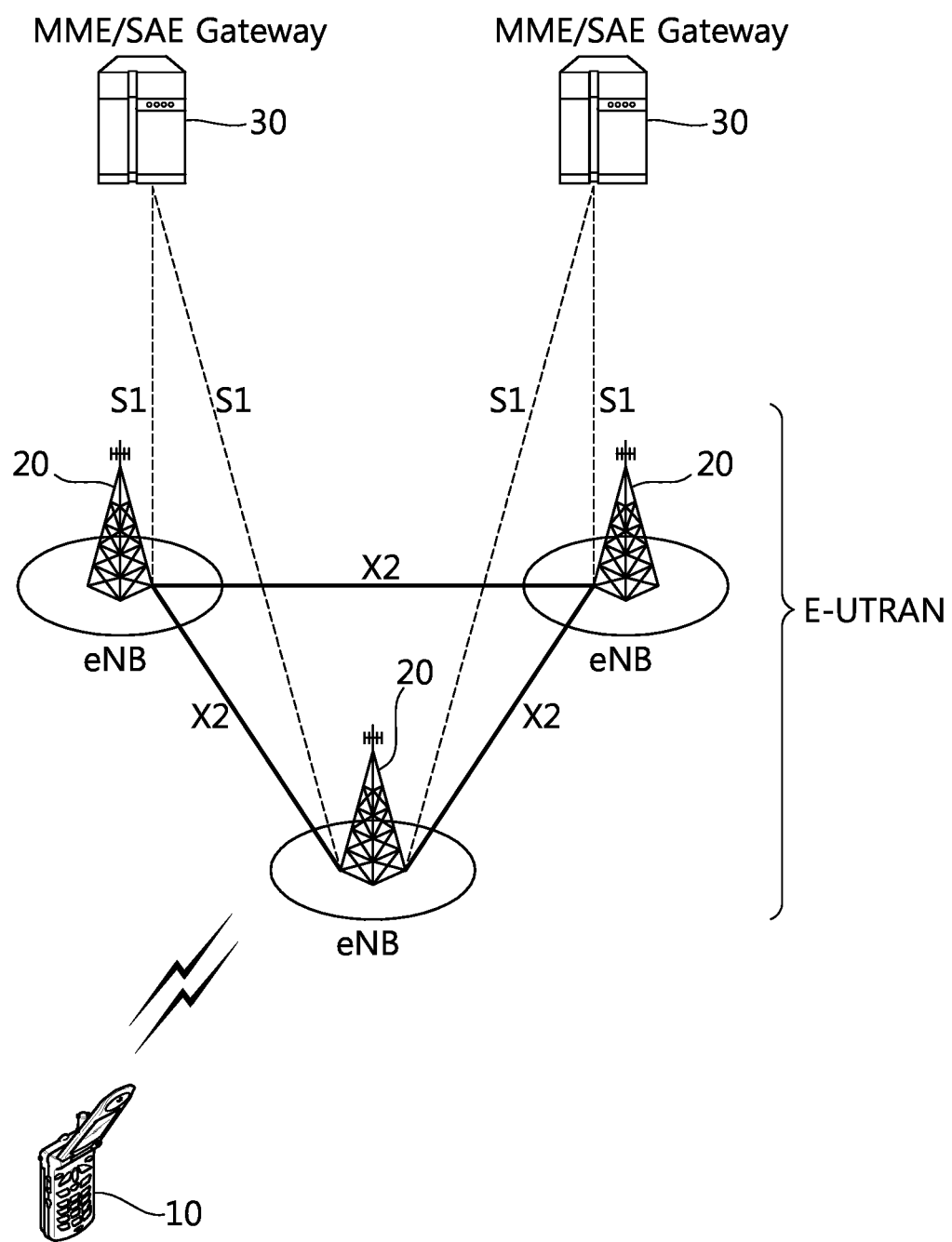
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
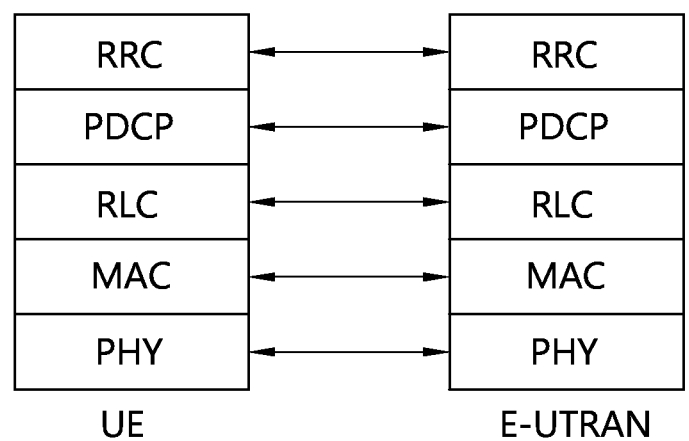
FIG. 2 is a diagram showing radio interface protocol architecture for a control plane.
Figure 3:
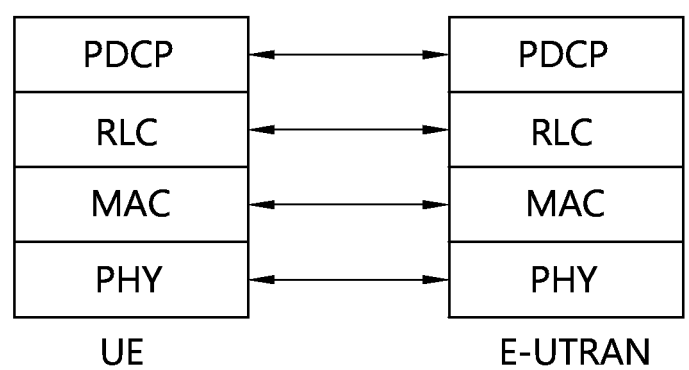
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
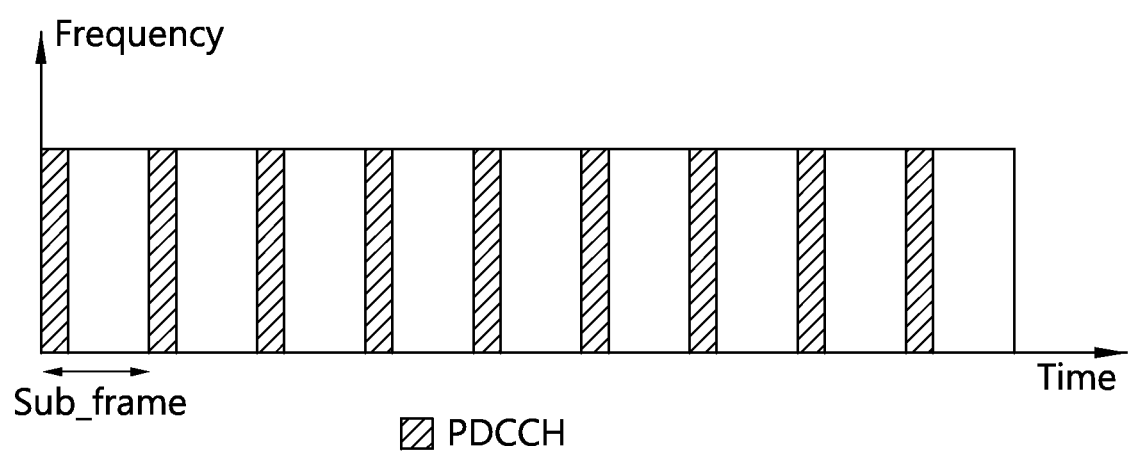
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC of a user equipment (UE) is logically connected to an RRC of an E-UTRAN. When an RRC connection is established between an RRC layer of the UE and an RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN can recognize the existence of the UE in RRC_CONNECTED and can effectively control the UE. Meanwhile, the UE in RRC_IDLE cannot be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE may establish the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving the paging message from the E-UTRAN.

A non-access stratum (NAS) layer belongs to an upper layer of the RRC layer and serves to perform session management, mobility management, or the like. To manage mobility of the UE in the NAS layer, two states, i.e., an EPS mobility management (EMM) registered state (EMM-REGISTERED) and an EMM deregistered state (EMM-DEREGISTERED), can be defined. The two states are applicable to the UE and the MME. The UE is initially in EMM-DEREGISTERED. To access the network, the UE may perform a process of registering to the network through an initial attach procedure. If the initial attach procedure is successfully performed, the UE and the MME may be in EMM-REGISTERED.

In addition, to manage a signaling connection between the UE and the EPC, two states, i.e., an EPS connection management (ECM) idle state (ECM-IDLE) and an ECM connected state (ECM-CONNECTED), can be defined. The two states are applicable to the UE and the MME. When the UE in ECM-IDLE establishes an RRC connection with the E-UTRAN, the UE may be in ECM-CONNECTED. When the MME in ECM-IDLE establishes an S1 connection with the E-UTRAN, the MME may be in ECM-CONNECTED. When the UE is in ECM-IDLE, the E-UTRAN does not have information on the context of the UE. Therefore, the UE in ECM-IDLE can perform a UE-based mobility related procedure such as cell selection or cell reselection without having to receive a command of the network. If a location of the UE in ECM-IDLE becomes different from a location known to the network, the UE may report the location of the UE to the network through a tracking area update procedure. On the other hand, the mobility of the UE in ECM-CONNECTED may be managed by the command of the network.

Figure 5:
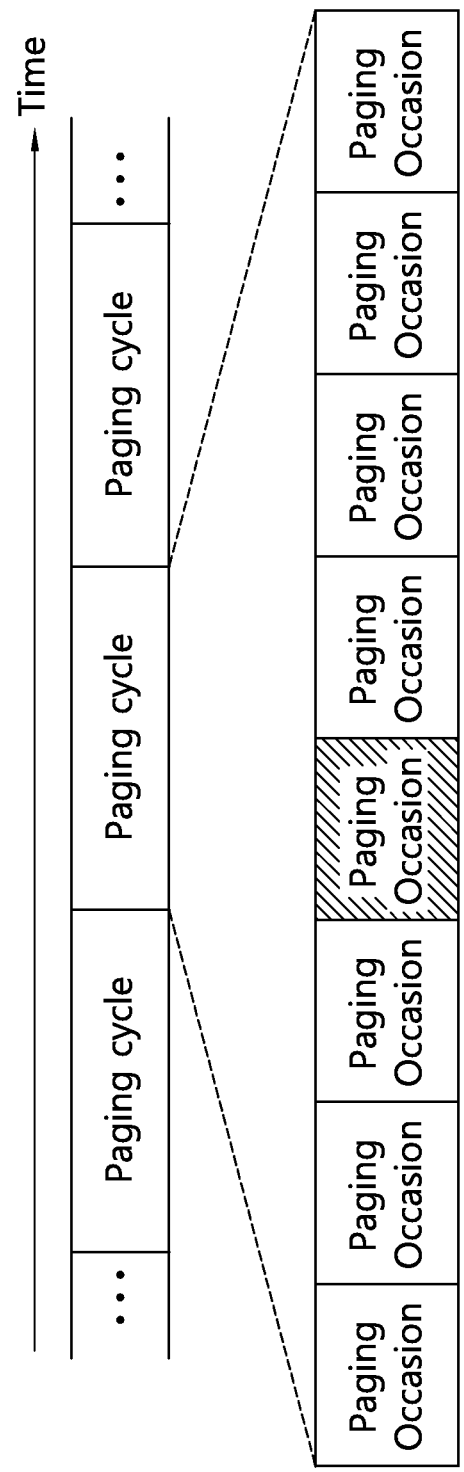
FIG. 5 shows transmission of a paging channel.

FIG. 5 shows transmission of a paging channel.

When there is data to be transmitted by a network to a specific UE or a call delivered to the specific UE, the paging message is used to search and wake up the UE. To transmit the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

System information is described below. It may be referred to Section 5.2 of 3GPP TS 36.331 V11.1.0 (2012-09).

System information is divided into a MasterInformationBlock (MIB) and a number of SystemInformationBlocks (SIBs). The MIB includes a limited number of most essential and most frequently transmitted parameters that are needed to acquire other information from the cell, and is transmitted on a BCH. SystemInformationBlockType1 contains information relevant when evaluating if a UE is allowed to access a cell and defines scheduling of other SIBs. SIBs other than the SystemInformationBlockType1 are carried in SystemInformation (SI) messages and mapping of SIBs to the SI messages is flexibly configurable by schedulingInfoList included in the SystemInformationBlockType1. Each SIB is contained only in a single SI message. Only SIBs having the same scheduling requirement (periodicity) can be mapped to the same SI message. The SystemInformationBlockType2 is always mapped to the SI message that corresponds to the first entry in the list of SI messages in schedulingInfoList. There may be multiple SI messages transmitted with the same periodicity. The SystemInformationBlockType1 and all SI messages are transmitted on a DL-SCH.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames.

The SystemInformationBlockType1 uses a fixed schedule with a periodicity of 80 ms and repetitions made within 80 ms. The first transmission of the SystemInformationBlockType1 is scheduled in subframe #5 of radio frames for which the SFN mod 8=0, and repetitions are scheduled in subframe #5 of all other radio frames for which SFN mod 2=0. A single system information radio network temporary identifier (SI-RNTI) is used to address the SystemInformationBlockType1 as well as all other SIBs. The SystemInformationBlockType1 configures an SI-window length and the transmission periodicity for all other SIBs.

The SI messages are transmitted within periodically occurring SI-windows using dynamic scheduling. Each SI message is associated with a SI-window, and SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than multicast broadcast single frequency network (MBSFN) subframes, uplink subframes in time domain duplex (TDD), and subframe #5 of radio frames for which SFN mod 2=0. The UE acquires the detailed time-domain scheduling (and other information, e.g. frequency-domain scheduling, used transport format) from decoding an SI-RNTI on a PDCCH.

The eNB may schedule DL-SCH transmissions concerning logical channels other than BCCH in the same subframe as used for the BCCH. The minimum UE capability restricts the BCCH mapped to DL-SCH, e.g. regarding the maximum rate. System information may also be provided to the UE by means of dedicated signaling, e.g. upon handover.

Figure 6:
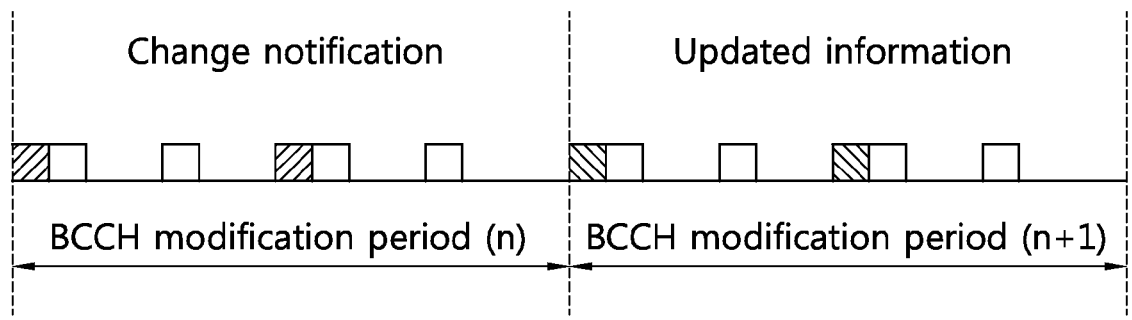
FIG. 6 shows a change of change of system information.

FIG. 6 shows a change of change of system information.

Change of system information only occurs at specific radio frames, i.e. concept of a modification period is used. System information may be transmitted a number of times with the same content within a modification period, as defined by its scheduling. The modification period boundaries are defined by SFN values for which SFN mod m=0, where m is the number of radio frames comprising the modification period. The modification period is configured by system information.

When a network changes (some of the) system information, it first notifies UEs about this change, i.e. this may be done throughout a modification period. In the next modification period, the network transmits updated system information. Referring to FIG. 6, different hatchings indicate different system information. Upon receiving a change notification, the UE acquires new system information immediately from the start of the next modification period. The UE applies the previously acquired system information until the UE acquires the new system information.

The paging message is used to inform UEs in RRC_IDLE and UEs in RRC_CONNECTED about a system information change. If the UE receives the paging message including systemInfoModification, it knows that the system information will change at the next modification period boundary. Although the UE may be informed about changes in the system information, no further details are provided e.g. regarding which system information will change.

The SystemInformationBlockType1 includes a value tag, systemInfoValueTag, that indicates if a change has occurred in the system information, as described in Table 1. The UE may use systemInfoValueTag, e.g. upon return from out of coverage, to verify if the previously stored system information is still valid. Additionally, the UE considers the stored system information to be invalid after 3 hours from the moment it was successfully confirmed as valid, unless specified otherwise.

The UE verifies that the stored system information remains valid by either checking systemInfoValueTag in the SystemInformationBlockType1 after the modification period boundary, or attempting to find systemInfoModification indication at least modificationPeriodCoeff times during the modification period in case no paging message is received, in every modification period. If no paging message is received by the UE during a modification period, the UE may assume that no change of the system information will occur at the next modification period boundary. If the UE in RRC_CONNECTED, during the modification period, receives one paging message, it may deduce from the presence/absence of systemInfoModification whether a change of the system information will occur in the next modification period or not.

Figure 7:
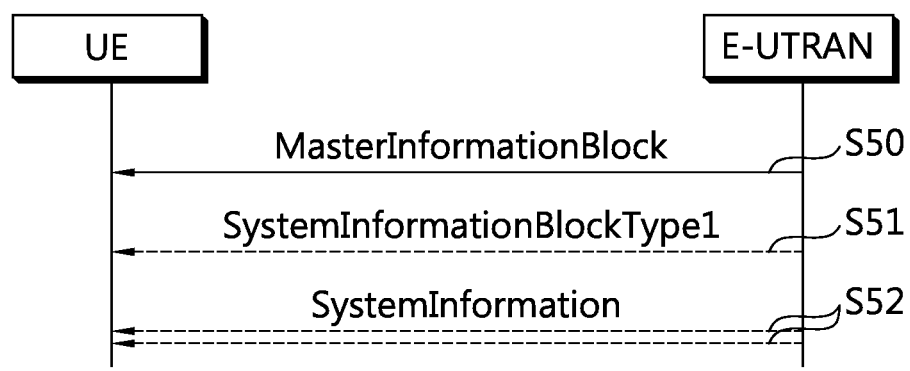
FIG. 7 shows a system information acquisition procedure.

FIG. 7 shows a system information acquisition procedure.

A UE applies a system information acquisition procedure to acquire an AS- and NAS-system information that is broadcasted by an E-UTRAN. The system information acquisition procedure applies to UEs in RRC_IDLE and UEs in RRC_CONNECTED.

Referring to FIG. 7, at step S50, a UE receives a MIB from an E-UTRAN. At step S51, the UE receives a SystemInformationBlockType1 from the E-UTRAN. At step S52, the UE receives system information from the E-UTRAN.

Figure 8:
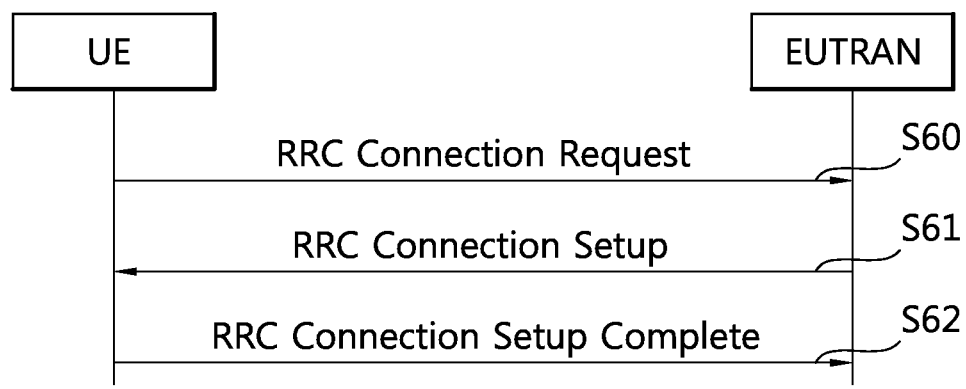
FIG. 8 shows an RRC connection establishment procedure.

FIG. 8 shows an RRC connection establishment procedure. It may be referred to Section 5.3.3 of 3GPP TS 36.331 V11.1.0 (2012-09). The purpose of this procedure is to establish an RRC connection. The RRC connection establishment may involve SRB1 establishment. The RRC connection establishment procedure is also used to transfer the initial NAS dedicated information/message from the UE to the E-UTRAN. The E-UTRAN may apply the RRC connection establishment procedure to establish SRB1 only.

Referring to FIG. 8, at step S60, the UE transmits an RRC connection request (RRCConnectionRequest) message to the E-UTRAN. At step S61, the E-UTRAN transmits an RRC connection setup (RRCConnectionSetup) message to the UE. At step S62, the UE transmits an RRC connection setup complete (RRCConnectionSetupComplete) message to the E-UTRAN.

Access class barring (ACB) is described below. It may be referred to Section 4.3.1 of 3GPP TS 22.011 V10.3.0 (2011-03).

If the UE is a member of at least one access class which corresponds to the permitted classes as signaled over the air interface, and the access class is applicable in the serving network, access attempts are allowed. Additionally, in the case of the access network being UTRAN the serving network can indicate that UEs are allowed to respond to paging and perform location registration, even if their access class is not permitted. Otherwise, access attempts are not allowed. Also, the serving network can indicate that UEs are restricted to perform location registration, although common access is permitted. If the UE responded to paging, it shall follow the normal defined procedures and react as specified to any network command.

Access classes are applicable as follows:
Classes 0-9: Home and visited public land mobile networks (PLMNs);
Classes 11 and 15: Home PLMN only if the equivalent home PLMN (EHPLMN) list is not present or any EHPLMN;
Classes 12, 13, 14: Home PLMN and visited PLMNs of home country only.
Any number of these classes may be barred at any one time.

The following is the requirements for enhanced access control on E-UTRAN.

The serving network shall be able to broadcast mean durations of access control and barring rates (e.g. percentage value) that commonly applied to access classes 0-9 to the UE. The same principle as in UMTS is applied for Access Classes 11-15.

The E-UTRAN shall be able to support access control based on the type of access attempt (i.e. mobile originating data or mobile originating signaling), in which indications to the UEs are broadcasted to guide the behavior of UE. The E-UTRAN shall be able to form combinations of access control based on the type of access attempt, e.g. mobile originating and mobile terminating, mobile originating, or location registration. The 'mean duration of access control' and the barring rate are broadcasted for each type of access attempt (i.e. mobile originating data or mobile originating signaling).

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed; otherwise, the access attempt is not allowed. If the access attempt is not allowed, further access attempts of the same type are then barred for a time period that is calculated based on the 'mean duration of access control' provided by the network and the random number drawn by the UE.

Extended access barring (EAB) is described below. It may be referred to Section 4.3.4 of 3GPP TS 22.011 V10.3.0 (2011-03).

The following requirements apply for EAB:
The UE is configured for EAB by the HPLMN.
EAB shall be applicable to all 3GPP radio access technologies.
EAB shall be applicable regardless of whether the UE is in a home or a visited PLMN.
A network may broadcast EAB information.

EAB information shall define whether EAB applies to UEs within one of the following categories:
a) UEs that are configured for EAB;
b) UEs that are configured for EAB and are neither in their HPLMN nor in a PLMN that is equivalent to it;
3) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN EAB information shall also include extended barring information for access classes 0-9.

A UE configured for EAB shall use its allocated access class(es), when evaluating the EAB information that is broadcast by the network, in order to determine if its access to the network is barred.

If a UE that is configured for EAB initiates an emergency call or is a member of an access class in the range 11-15 and that Access Class is permitted by the network, then the UE shall ignore any EAB information that is broadcast by the network.

If the network is not broadcasting the EAB information, the UE shall be subject to access barring.

If the EAB information that is broadcast by the network does not bar the UE, the UE shall be subject to access barring.

The SystemInformationBlockType14 information element (IE) contains the EAB parameters. Table 1 shows an example of the SystemInformationBlockType14 IE.

TABLE 1

```
-- ASN1START
SystemInformationBlockType14-r11 ::= SEQUENCE {
eab-Param-r11 CHOICE {
eab-Common-r11 EAB-Config-r11,
eab-PerPLMN-List-r11 SEQUENCE (SIZE (1..6)) OF
EAB-ConfigPLMN-r11
} OPTIONAL, -- Need OR
lateNonCriticalExtension OCTET STRING OPTIONAL, -- Need OP
...
}
EAB-ConfigPLMN-r11 ::= SEQUENCE {
eab-Config-r11 EAB-Config-r11 OPTIONAL -- Need OR
}
EAB-Config-r11 ::= SEQUENCE {
eab-Category-r11 ENUMERATED {a, b, c, spare},
eab-BarringBitmap-r11 BIT STRING (SIZE (10))
}
-- ASN1STOP
```

Change of EAB parameters can occur at any point in time. The EAB parameters are contained in SystemInformationBlockType14. The paging message is used to inform EAB capable UEs in RRC_IDLE about a change of EAB parameters or that the SystemInformationBlockType14 is no longer scheduled. If the UE receives the paging message including the eab-ParamModification, it shall acquire the SystemInformationBlockType14 according to schedulingInfoList contained in SystemInformationBlockType1. If the UE receives the paging message including the eab-ParamModification while it is acquiring the SystemInformationBlockType14, the UE shall continue acquiring the SystemInformationBlockType14 based on the previously acquired schedulingInfoList until it re-acquires schedulingInfoList in the SystemInformationBlockType1. That is, if in RRC_IDLE, the eab-ParamModification is included and the UE is EAB capable, the UE re-acquire the SystemInformationBlockType14 using the system information acquisition procedure.

Table 2 shows an example of the paging message.

TABLE 2

```
-- ASN1START
Paging ::= SEQUENCE {
pagingRecordList PagingRecordList OPTIONAL, -- Need ON
systemInfoModification ENUMERATED {true} OPTIONAL, -- Need ON
etws-Indication ENUMERATED {true} OPTIONAL, -- Need ON
nonCriticalExtension Paging-v890-IEs OPTIONAL
}
Paging-v890-IEs ::= SEQUENCE {
lateNonCriticalExtension OCTET STRING OPTIONAL, -- Need OP
nonCriticalExtension Paging-v920-IEs OPTIONAL
}
Paging-v920-IEs ::= SEQUENCE {
cmas-Indication-r9 ENUMERATED {true} OPTIONAL, -- Need ON
nonCriticalExtensionPaging-v11xy-IEs OPTIONAL
}
Paging-v11xy-IEs ::= SEQUENCE {
eab-ParamModification-r11 ENUMERATED {true} OPTIONAL, -- Need ON
nonCriticalExtension SEQUENCE { } OPTIONAL -- Need OP
}
PagingRecordList ::= SEQUENCE (SIZE (1..maxPageRec)) OF PagingRecord
PagingRecord ::= SEQUENCE {
ue-Identity PagingUE-Identity,
cn-Domain ENUMERATED {ps, cs},
...
}
PagingUE-Identity ::= CHOICE {
s-TMSI S-TMSI,
imsi IMSI,
...
}
IMSI ::= SEQUENCE (SIZE (6..21)) OF IMSI-Digit
IMSI-Digit ::= INTEGER (0..9)
-- ASN1STOP
```

Referring to Table 2, the paging message includes the eab-ParamModification field. If present, the eab-ParamModification field indicates EAB parameters, i.e. SIB14, modification.

EAB check is performed as follows. The UE shall:
1> if SystemInformationBlockType14 is present and includes the eab-Param:
  2> if the eab-Common is included in the eab-Param:
    3> if the UE belongs to the category of UEs as indicated in the eab-Category contained in eab-Common; and
    3> if for the access class of the UE that with a value in the range 0 . . . 9, as stored on the USIM, the corresponding bit in the eab-BarringBitmap contained in eab-Common is set to one:
      4> consider access to the cell as barred;
    3> else:
      4> consider access to the cell as not barred due to EAB;
  2> else (the eab-PerPLMN-List is included in the eab-Param):
    3> select the entry in the eab-PerPLMN-List corresponding to the PLMN selected by upper layers;
    3> if the eab-Config for that PLMN is included:
      4> if the UE belongs to the category of UEs as indicated in the eab-Category contained in eab-Config; and
      4> if for the access class of the UE that with a value in the range 0 . . . 9, as stored on the USIM, the corresponding bit in the eab-BarringBitmap contained in eab-Config is set to one:
        5> consider access to the cell as barred;
      4> else:
        5> consider access to the cell as not barred due to EAB;
    3> else:
      4> consider access to the cell as not barred due to EAB;
1> else:
  2> consider access to the cell as not barred due to EAB;

According to the description above, the UE shall ensure that it has valid SystemInformationBlockType14 (if scheduled) before performing an access subject to EAB check. Therefore, the UE shall not initiate the RRC connection establishment subject to EAB until the UE has a valid SystemInformationBlockType14 if broadcast. In addition, the UE maintains a valid SystemInformationBlockType14 based on reading paging notifications. However, in a specific scenario, some ambiguity for receiving EAB parameters may occur.

Figure 9:
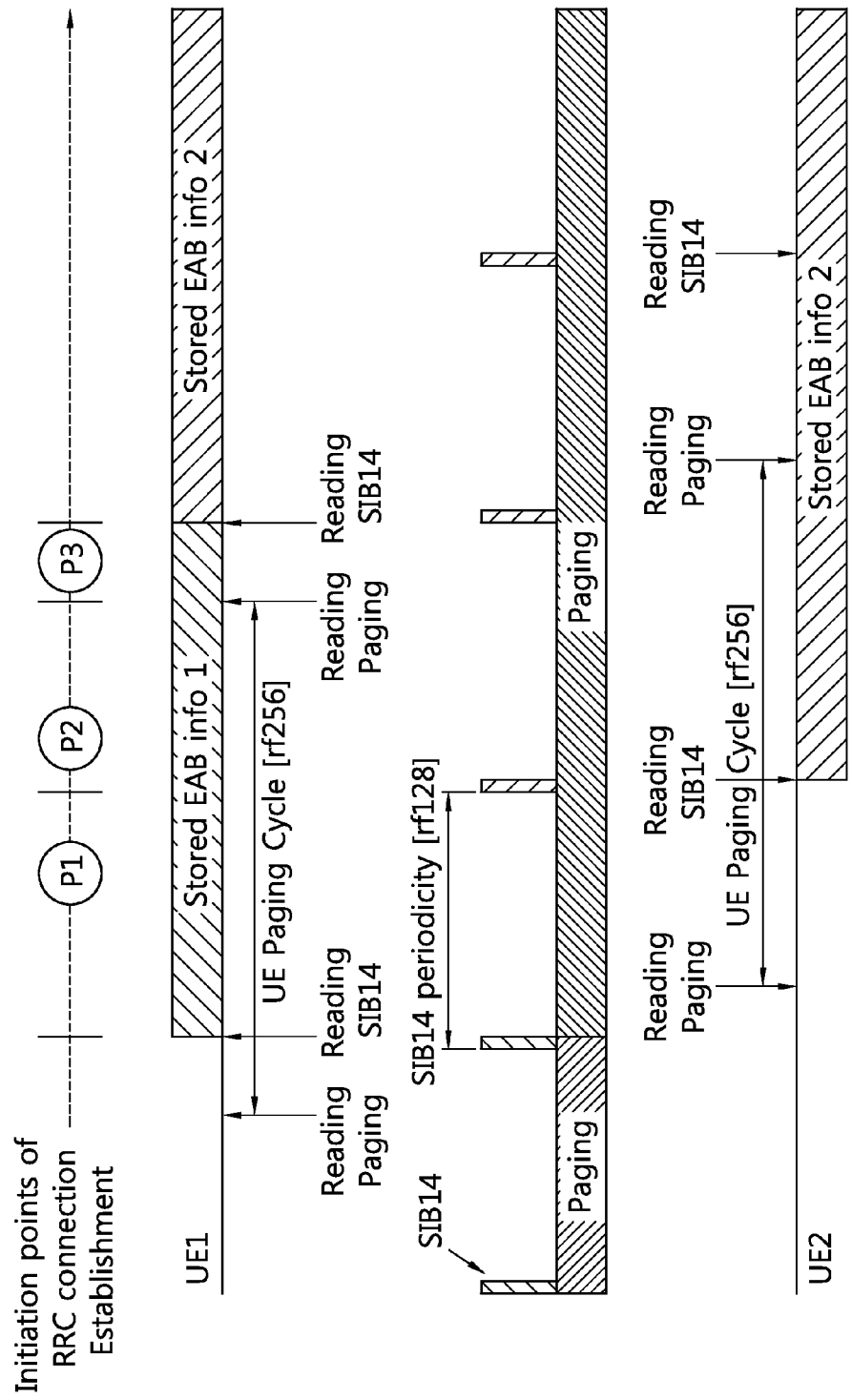
FIG. 9 shows an example of a method for receiving EAB parameters according to the conventional art.

FIG. 9 shows an example of a method for receiving EAB parameters according to the conventional art.

Referring to FIG. 9, the UE maintains a valid SystemInformationBlockType14 (hereinafter, SIB14) based on reading paging notifications. It is assumed that UE paging cycles are longer than a SIB14 periodicity. For example, in FIG. 9, the UE paging cycle is 256 radio frames, and the SIB14 periodicity is 128 radio frames. The UE1 and UE2 that monitor the same SIB14 use the same UE paging cycle to read the paging message. However, the UE1 and UE2 have different paging occasions, and therefore, the UE1 reads the paging message before the UE2. In this case, as described in FIG. 9, the SIB14 may be transmitted between different paging occasions of the UE1 and UE2. Accordingly, the UE1 and UE2 may have different SIB14 including different EAB parameters each other. In FIG. 9, different hatchings of SIB14 correspond to old and updated EAB parameters (EAB info 1 and 2) in the SIB14. And, in FIG. 9, different hatchings of the paging correspond to old and updated eab-ParamModification in the paging message.

According to the scenario described in FIG. 9, the UE and eNB may apply different EAB parameters at a certain point of time, e.g. P2/P3 in FIG. 9. That is, the UE1 apply the EAB parameter 1 (old EAB parameter), while the eNB broadcast the SIB14 including the EAB parameter 2 (updated EAB parameter), at P2/P3 in FIG. 9. In addition, different UEs may apply different EAB parameters at a certain point of time, e.g. P1, P2/P3 in FIG. 9, because different UEs in RRC_IDLE maintains a valid SIB14 by reading paging notifications based on UE specific paging occasions. At P1 in FIG. 9, the UE1 has a valid SIB14 including EAB parameter 1, but UE2 does not have a valid SIB14. At P2/P3 in FIG. 9, the UE1 apply the EAB parameter 1 (old EAB parameter), while the UE2 apply the EAB parameter 2 (updated EAB parameter).

How each UE applies EAB parameters upon initiation of the RRC connection establishment, depending on initiation point, P1, P2/P3, is described in detail.

1) At P1 in FIG. 9, if the UE1/UE2 initiates the RRC connection establishment:
  eNB: the EAB parameter 1 is still valid at P1 in the eNB. The EAB parameter 1 will be updated to the EAB parameter 2 sooner or later, though.
  UE1: the stored EAB parameter 1 is valid in the UE1. So, upon the RRC connection establishment, the UE1 applies EAB based on the EAB parameter 1.
  UE2: the stored EAB parameter is not available in the UE2. But, the UE2 identifies eab-ParamModification in the paging message before P1. Thus, whether the UE2 should apply EAB after reading updated SIB14 or the UE2 does not apply EAB is not clear.

2) At P2 in FIG. 9, if the UE1/UE2 initiates the RRC connection establishment:
  eNB: the EAB parameter 1 has been updated to the EAB parameter 2. The EAB parameter 1 is not valid, now.

UE1: the stored EAB parameter 1 is valid in the UE1. So, upon the RRC connection establishment, the UE1 will apply EAB based on the EAB parameter 1, because the UE1 maintains up-to-date SIB14 not by directly reading every SIB14, but by relying on paging notifications. Thus, there is mismatch between the UE1 and the eNB. Whether the UE1 should read the SIB14 before applying EAB or the UE1 should apply EAB with the old EAB parameter 1 is not clear. This problem occurs when the paging discontinuous reception (DRX) cycle is longer than the SIB14 periodicity.

UE2: the stored EAB parameter 2 is valid in the UE2. So, upon the RRC connection establishment, the UE2 applies EAB based on the EAB parameter 2.

3) At P3 in FIG. 9, if the UE1/UE2 initiates the RRC connection establishment:

eNB: the EAB parameter 1 has been updated to the EAB parameter 2. The EAB parameter 1 is not valid, now.

UE1: the stored EAB parameter 1 is valid in the UE1. So, upon the RRC connection establishment, the UE1 may apply EAB based on the EAB parameter 1. However, the UE1 identifies eab-ParamModification in the paging message before P3. Thus, whether the UE1 should apply EAB after reading updated SIB14 or the UE1 should apply EAB based on the old EAB parameter 1 is not clear.

UE2: the stored EAB parameter 2 is valid in the UE2. So, upon the RRC connection establishment, the UE2 applies EAB based on the EAB parameter 2.

In summary, the following two cases should be clarified for the scenario described in FIG. 9.

1) Case 1: if the UE has identified eab-ParamModification in the paging message, it should be clarified that when the NAS layer of the UE requests the RRC connection establishment, whether the RRC layer of the UE should wait until acquiring updated SIB14 (to avoid potential mismatch between the eNB and the UE), or the RRC layer of the UE should apply EAB immediately upon the request from the NAS layer of the UE.

2) Case 2: if the UE has no its paging occasion (i.e. no paging is received) following the recently scheduled SIB14, but if the UE knows upcoming SIB14 schedule based on the SI periodicity, it should be clarified that when the NAS layer of the UE requests the RRC connection establishment, whether the RRC layer of the UE should wait and read upcoming SIB14 (to avoid potential mismatch between the eNB and the UE) before applying EAB, or the UE should apply EAB immediately upon the request from the NAS layer of the UE.

Therefore, to solve the problems described above, how to receive EAB parameters and how to apply EAB upon connection establishment according to embodiments of the present invention is described below.

For the case 1 described above, i.e. when the NAS layer of the UE initiates the RRC connection establishment after receiving the eab-ParamModification in the paging message, but before receiving the corresponding SIB14, since the UE shall not initiate the RRC connection establishment subject to EAB until the UE has a valid SIB14, the UE may need to wait and receive the SIB14 before applying EAB. However, if the UE has previously received SIB14, the UE may not make sure whether the UE will acquire updated EAB parameters or the same EAB parameters from upcoming SIB14.

Thus, the RRC layer of the UE may need to apply EAB immediately upon the request from the NAS layer of the UE. That is, when the NAS layer of the UE initiates the RRC connection establishment after receiving the eab-ParamModification in the paging message, but before receiving the corresponding SIB14 (in case that the UE has available EAB parameters), the RRC layer of the UE may not wait to acquire upcoming SIB14, i.e. may apply available EAB parameters immediately, upon the request from the NAS layer of the UE. According to this embodiment of the present invention, the UE may initiate the RRC connection establishment subject to EAB based on the old EAB parameters, even though SIB14 is updated in the eNB. But, the old EAB parameters should be valid in the UE, because the UE relies on paging notification to maintain up-to-date SIB14. There may be mismatch between the UE and the eNB, though. In case that the UE has no available EAB parameters at the cell, the RRC layer of the UE shall wait to acquire upcoming SIB14.

Alternatively, when the NAS layer of the UE initiates the RRC connection establishment after receiving the eab-ParamModification in the paging message, but before receiving the corresponding SIB14, the RRC layer of the UE may wait to acquire upcoming SIB14 and then apply EAB after acquiring SIB14. According to this embodiment of the present invention, the UE does not initiate the RRC connection establishment subject to EAB until the UE has a valid SIB14. Namely, upon the connection establishment subject to EAB, every UE would need to postpone applying EAB before acquiring upcoming SIB14. Therefore, mismatch between the UE and the eNB may be avoided. Usage of paging notification for EAB would be undermined.

For the case 2 described above, when the NAS layer of the UE initiates the RRC connection establishment subject to EAB, if the UE has no its paging occasion (i.e. no paging is received) following the recently scheduled SIB14, mismatch between the UE and the eNB occurs because the paging DRX cycle is longer than the SIB14 periodicity, and also because the UE relies on paging notifications to monitor SIB14.

In this case, when the NAS layer of the UE initiates the RRC connection establishment subject to EAB, if the UE has no its paging occasion (i.e. no paging is received) following the recently scheduled SIB14 (in case that UE has available EAB parameters), the RRC layer of the UE may not wait to acquire upcoming SIB14, i.e. apply available EAB parameters immediately upon the request from the NAS layer of the UE. Since the UE relies on paging notifications, it seems to be unlikely that the UE wait to acquire upcoming SIB14 without paging notification, only due to potential SIB14 change. In case that the UE has no available EAB parameters at the cell, the RRC layer of the UE shall wait to acquire upcoming SIB14.

Alternatively, when the NAS layer of the UE initiates the RRC connection establishment subject to EAB, if the UE has no its paging occasion (i.e. no paging is received) following the recently scheduled SIB14, the RRC layer of the UE may wait to acquire upcoming SIB14 and then apply EAB after acquiring SIB14.

Alternatively, the eNB may make sure that the paging DRX cycle is equal to or less than the SIB14 periodicity. That is, a cell configuration is restricted in advance, and accordingly, the eNB could exclude the case that the paging DRX cycle is longer than the SIB14 periodicity.

Figure 10:
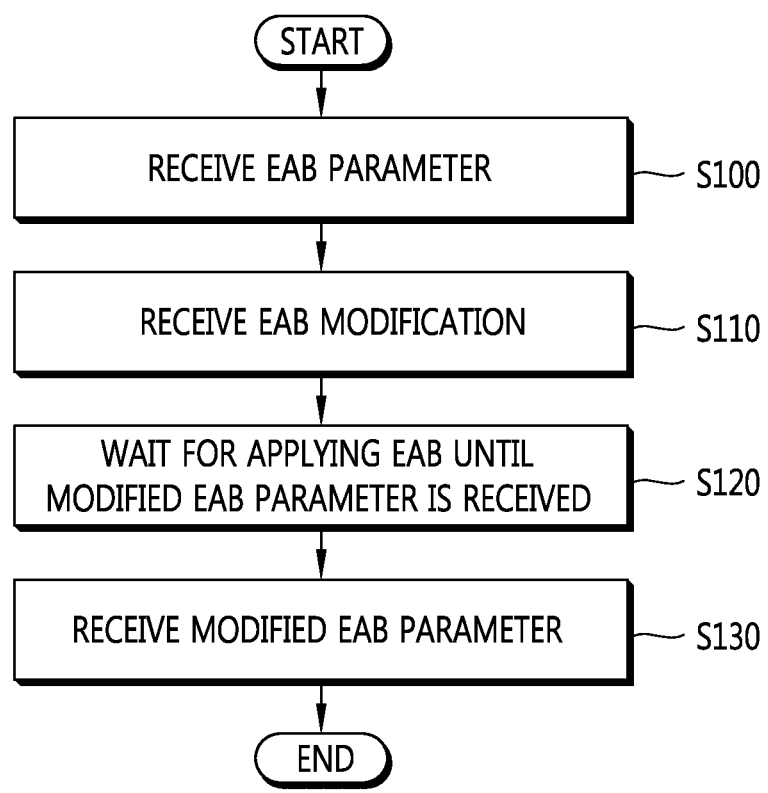
FIG. 10 shows an example of a method for receiving EAB parameters according to an embodiment of the present invention.

FIG. 10 shows an example of a method for receiving EAB parameters according to an embodiment of the present invention.

At step S100, the UE receives an EAB parameter. The EAB parameter may be received via the SIB14.

At step S110, the UE receives an EAB parameter modification. The received EAB parameter is invalidated upon receiving the EAB parameter modification. The EAB parameter modification may be an eab-ParamModification field in the paging message.

At step S120, the UE waits for applying EAB until modified EAB parameter is received. That is, when the NAS layer of the UE initiates the RRC connection establishment after receiving the eab-ParamModification in the paging message, but before receiving the corresponding SIB14, the RRC layer of the UE shall wait to acquire upcoming SIB14.

At step S130, the UE receives the modified EAB parameter. The modified EAB parameter may also be received via the SIB14. Then, UE applies EAB according to the modified EAB parameter, after acquiring SIB14.

UE behaviors, according to the embodiment of the present invention described in FIG. 10, are as follows.

1> if in RRC_IDLE, the eab-ParamModification is included and the UE is EAB capable:

2> consider SystemInformationBlockType14 invalid, if previously received;

2> re-acquire SystemInformationBlockType1 immediately, i.e., without waiting until the next system information modification period boundary;

2> re-acquire SystemInformationBlockType14 using the system information acquisition procedure;

According to the embodiment of the present invention described in FIG. 10, the UE shall verify validity of SIB14 by receiving upcoming SIB14 whenever the UE initiates the RRC connection establishment. Hence, upon initiation of the RRC connection establishment subject to EAB at a cell, the UE shall postpone applying EAB before acquiring upcoming SIB14. Accordingly, there is no mismatch of valid SIB14 between the UE and the cell.

Figure 11:
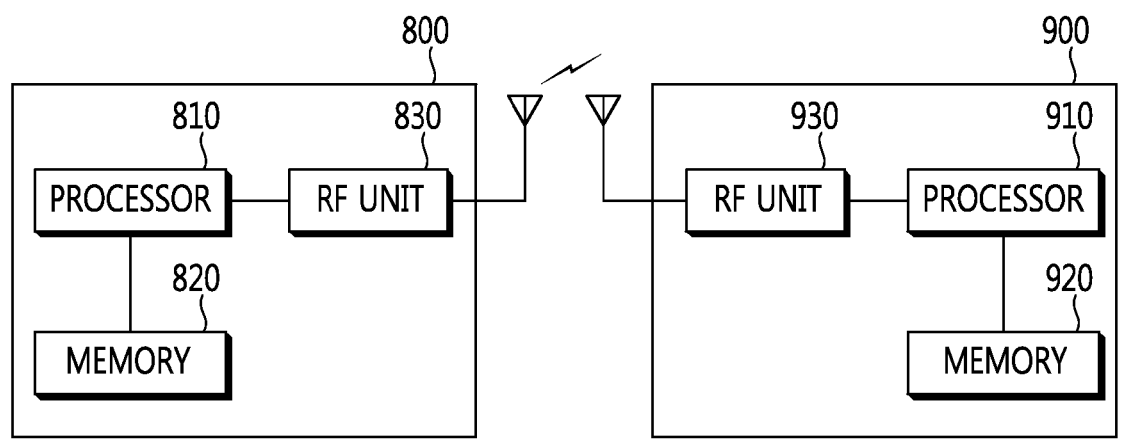
FIG. 11 is a block diagram showing wireless communication system to implement an embodiment of the present invention.

FIG. 11 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving, by a user equipment (UE), extended access barring (EAB) parameters in a wireless communication system, the method comprising:

receiving, by a radio resource control (RRC) layer of the UE, an EAB parameter via a system information block (SIB)-14 message;

receiving, by the RRC layer of the UE, an EAB parameter modification, which indicates that the EAB parameter is to be modified, via a paging message, wherein the received EAB parameter is invalidated upon receiving the EAB parameter modification;

receiving, by the RRC layer of the UE, a request for initiation of a RRC connection establishment from a non-access stratum (NAS) layer of the UE;

waiting, by the RRC layer of the UE, for receiving a modified EAB parameter;

receiving, by the RRC layer of the UE, the modified EAB parameter via the SIB-14 message; and applying, by the RRC layer of the UE, EAB for the RRC connection establishment according to the modified EAB parameter.

2. The method of claim 1, wherein the UE is in an RRC idle state.

3. The method of claim 1, wherein receiving the modified EAB parameter via the SIB-14 message comprises:

receiving a SIB-1 message, which defines a scheduling of the modified SIB-14 message, without waiting until a next system information modification period boundary; and receiving the SIB-14 message according to the scheduling by the SIB-1 message.

4. A user equipment (UE) in a wireless communication system, the UE comprising:

a radio frequency (RF) unit that transmits or receives a radio signal; and a processor, coupled to the RF unit, that:

controls the RF unit to receive, by a radio resource control (RRC) layer of the UE, an extended access barring (EAB) parameter via a system information block (SIB)-14 message;

controls the RF unit to receive, by the RRC layer of the UE, an EAB parameter modification, which indicates that the EAB parameter is to be modified, via a paging message, wherein the received EAB parameter is invalidated upon receiving the EAB parameter modification;

controls the RF unit to receive, by the RRC layer of the UE, a request for initiation of a RRC connection establishment from a non-access stratum (NAS) layer of the UE;

waits to receive, by the RRC layer of the UE, a modified EAB parameter;

controls the RF unit to receive, by the RRC layer of the UE, the modified EAB parameter via the SIB-14 message; and applies, by the RRC layer of the UE, EAB for the RRC connection establishment according to the modified EAB parameter.

5. The UE of claim 4, wherein the UE is in an RRC idle state.

6. The UE of claim 4, wherein the processor, in receiving the modified EAB parameter via the SIB-14 message, further controls the RF unit to:

receive a SIB-1 message, which defines a scheduling of the modified SIB-14 message, immediately without waiting until a next system information modification period boundary; and receive the SIB-14 message according to the scheduling by the SIB-1 message.

\* \* \* \* \*